June 3, 1930.   L. W. SULLIVAN   1,761,757
BEARING
Filed Dec. 5, 1927

Inventor
Lambert W. Sullivan,
By Horatio E. Bellows
Attorney

Patented June 3, 1930

1,761,757

UNITED STATES PATENT OFFICE

LAMBERT W. SULLIVAN, OF WOONSOCKET, RHODE ISLAND

BEARING

Application filed December 5, 1927. Serial No. 237,676.

My invention relates to bearings for pulleys and the like.

The essential objects of my invention are to insure perfect oil circulation; to effect an even distribution of the oil film over the entire surface of the bearing; and to utilize the retaining collar for lubricating purposes.

To the above ends essentially my invention consists in such parts and combinations of parts as fall within the scope of the appended claim.

In the accompanying drawings which form a part of this invention

Like reference characters indicate like parts throughout the views.

Figure 1:
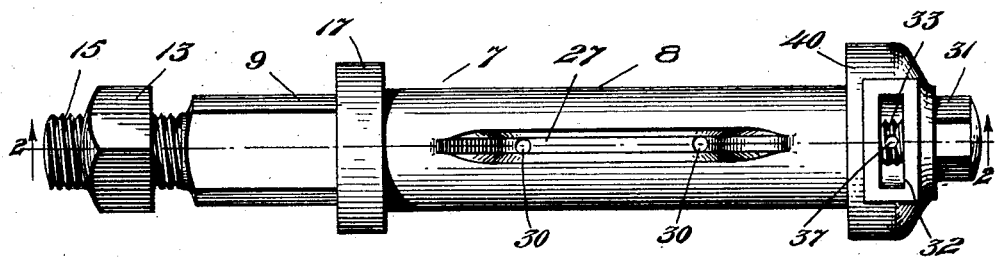
Figure 1 is a plan view of a bearing or mounting embodying my invention.
Figure 2:
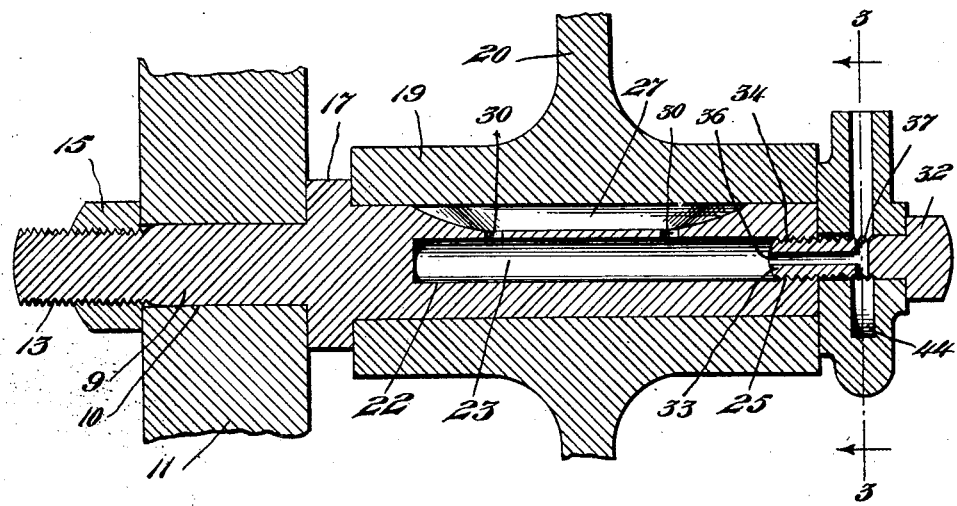
Figure 2 is a section of the same on line 2—2 of Figure 1, showing in similar fragmentary section a pulley or wheel mounted thereon, and a support in which the bearing is mounted, and Figure 3, a section taken on line 3—3 of Figure 2.
Figure 3:
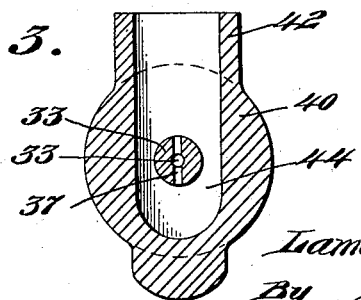

As herein illustrated a stud or fixed shaft 7 has a bearing or operating portion 8, continuous with a flattened extension 9 adapted to traverse a slot 10 in a machine frame or other support 11. The extension terminates in a threaded stem 13 to accommodate an attaching nut 15.

The shaft 7 has an integral annular shoulder or collar 17 upon the inner end of its operating portion constituting one abutment for the hub 19 of a loose pulley 20. A central longitudinal bore 22 extends from the outer end face of the shaft nearly to the plane of the shoulder 17 forming an axial chamber 23. Adjacent its outer end the bore is provided with a screw thread 25. Centrally of the portion 8 of the shaft is an elongated longitudinally disposed peripheral cavity 27 with tapering ends to which lead transverse passages 30 from the chamber 23.

A clamping screw or bolt 31 comprises a head 32 and a shank 33 provided with a thread 34 engaging the thread 25 in the shaft. Only the inner portion of the shank is within the shaft. The remainder of the screw projects from the end face of the latter. An axial duct or passage 36 in the screw shank communicates with a transverse duct or passage 37.

A hollow abutment disk or collar 40 of greater diameter than the shaft 7 is mounted upon the projecting portion of the screw and engages the face of the pulley hub opposite that engaged by the shoulder 17 with which it cooperates. In detail the collar has a vertically disposed tubular peripheral filling neck 42 communicating with a U shaped supply chamber 44 through which the screw 31 passes, and with which the duct 37 communicates. The collar 40 is normally rigidly held against the end face of the shaft by the screw 31 whose head 32 abuts against the outer face of the collar.

Oil is supplied to the chamber 44 of the collar 40 through the neck 42 and passes to the chamber 23 through the ducts 37 and 36. From the latter chamber the oil is drawn by a partial vacuum through the passages 30 into the cavity 27. The pulley in its rotation wipes a film of oil from the cavity over the whole circumference of the bearing portion of the shaft.

It will be understood that the number of pulleys upon the shaft is immaterial.

I claim:—

A bearing of the character described comprising a stationary shaft provided with a bearing portion continuous with a flattened extension adapted to traverse a slot in a support, said extension having a threaded stem, said shaft having a shoulder constituting an abutment for the hub of a pulley, and a longitudinal bore forming an axial chamber, said bore formed with a screw thread, said shaft having a central longitudinal peripheral cavity with tapered ends and passages connecting with said chamber, a headed hollow clamping screw engaged with the thread of the shaft, and a hollow abutment collar of greater diameter than the said shaft and mounted on the projecting part of the screw and engaging the face of the pulley and having a filling neck and supply chamber through which the screw passes and with which the axial chamber is in communication.

In testimony whereof I have affixed my signature.

LAMBERT W. SULLIVAN.